United States Patent [19]

O'Conner

[11] Patent Number: 5,274,378
[45] Date of Patent: Dec. 28, 1993

[54] DOCKING VELOCITY INDICATOR SYSTEM

[76] Inventor: Joe S. O'Conner, Tulpenstrasse 5, 7798 Pfullendorf 4, Fed. Rep. of Germany

[21] Appl. No.: 866,210

[22] Filed: Apr. 9, 1992

[51] Int. Cl.$^5$ .............................................. G01S 13/00
[52] U.S. Cl. ..................................................... 342/23
[58] Field of Search .......................................... 342/23

[56] References Cited

U.S. PATENT DOCUMENTS

| | | | |
|---|---|---|---|
| 3,594,716 | 7/1971 | Waterman | 342/23 |
| 3,707,717 | 12/1972 | Frielinghaus | 342/23 |
| 3,772,693 | 11/1973 | Allard et al. | 342/23 |
| 4,063,240 | 12/1977 | Isbister et al. | 342/23 |

Primary Examiner—Mark Hellner
Attorney, Agent, or Firm—James Creighton Wray

[57] ABSTRACT

A relative velocity indicator system for assistance in the docking of vessels uses a radar sensor providing a relative velocity signal indicative of the relative velocity between a ship and a reference, such as a dock. A wireless transmitter associated with the radar sensor receives said relative velocity signal and transmits a signal indicative of said relative velocity signal. A portable receiver and indicator unit carried by the captain of the vessel has a receiver for receiving the transmitted signal and an indicator arranged to receive, from said receiver, a receiver signal indicative of the transmitted signal and, thereby, of the relative velocity signal for indicating the relative velocity between ship and reference.

4 Claims, 3 Drawing Sheets

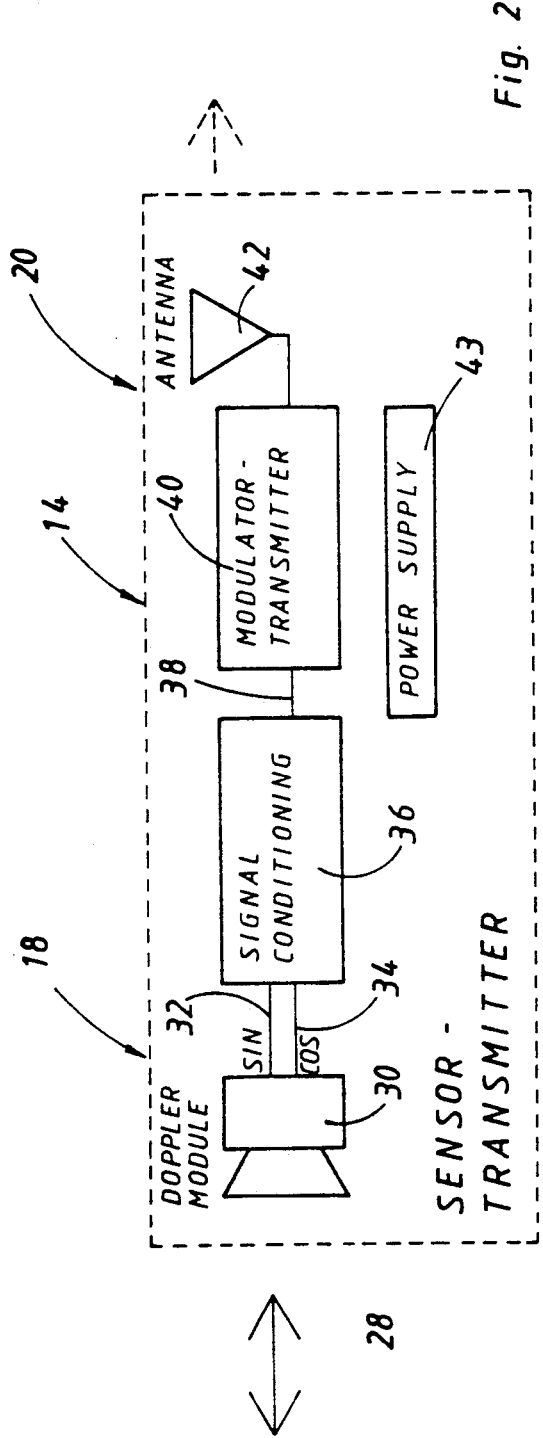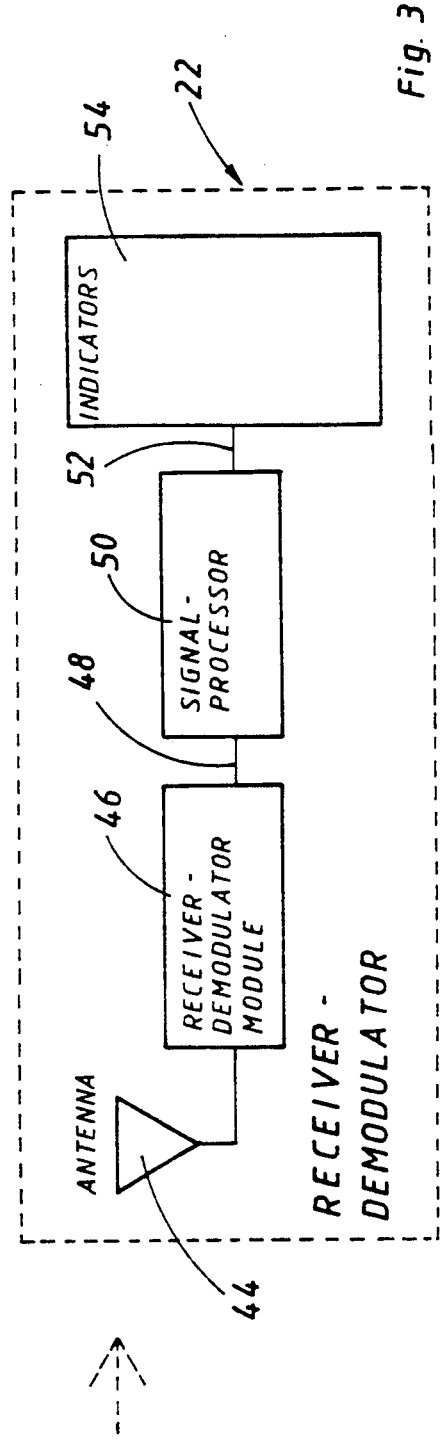

DOCKING VELOCITY INDICATOR SYSTEM

BACKGROUND OF THE INVENTION

The invention relates to a relative velocity indicator system for assistance in the docking of vessels.

The docking of vessels requires considerable skill and experience on the part of the captain or pilot. The vessel has to approach the dock extremely slowly. Otherwise, due to the huge mass of ships, damages both of the ship and of the dock might be caused. This is particularly true for large ships such as oil tankers. Usually, the captain or pilot is not able to see the gap between ship and dock. In the case of fog, he may even not be able to see the ends of his ship.

It is an object of the invention to provide a system which facilitates the docking of a vessel.

SUMMARY OF THE INVENTION

According to the invention this objective is achieved by radar means providing a relative velocity signal indicative of the relative velocity between a ship and a reference, wireless transmitter means associated with said radar means receiving said relative velocity signal and for transmitting a signal indicative of said relative velocity signal, and a receiver and indicator unit comprising receiver means for receiving said transmitted signal and indicator means arranged to receive, from said receiver means, a receiver signal indicative of said transmitted signal and, thereby, of said relative velocity signal for indicating said relative velocity. Preferably said radar means are stationary on a dock and are arranged to detect approaching vessels. Said radar means comprises more than one radar devices spaced on said dock, and said transmitter means comprise more than one transmitter device, each of said radar devices being connected to an associated one of said transmitter devices, said receiver means being adapted to receive transmitted signals from said more than one transmitter devices, said indicator means being adapted to simultaneously indicate relative velocities measured by said more than one radar devices.

An embodiment of the invention will now be described in greater detail with reference to the accompanying drawings.

BRIEF DESCRIPTION OF THE DRAWINGS

FIG. 2 is a block diagram and shows the radar device and associated transmitter.

FIG. 3 is a block diagram and shows the receiver and indicator unit.

DETAILED DESCRIPTION OF THE DRAWINGS

Figure 1:
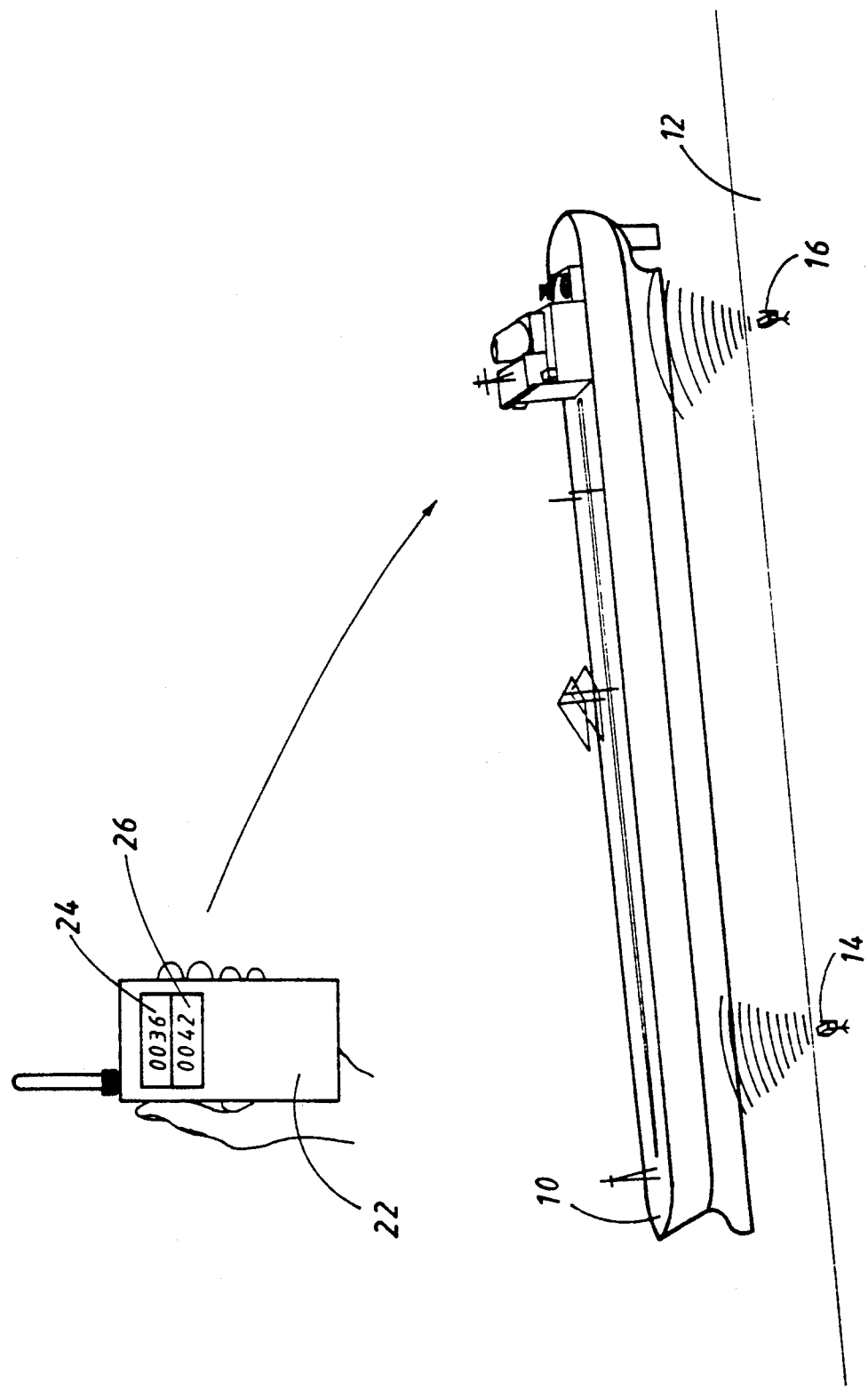
FIG. 1 is a schematic illustration and shows a ship approaching a dock, the velocity of the ship relative to the dock being monitored by radar devices, the relative velocity being indicated by a receiver and indicator unit.

In FIG. 1, numeral designates a large ship such as an oil tanker. The ship 10 is approaching a dock 12. Located on the dock are two stationary Doppler radar devices 14 and 16. The radar devices 14 and 16 are spaced by a distance which is slightly less than the length of the ship 10. Thus one of the radar devices 14 measures the approaching velocity of the head of the ship 10, while the other radar device 16 measures the approaching velocity of the stern of the ship 10. If these velocities were different, this would be an indication of a turning motion of the ship 10.

As can be seen from FIG. 2, the radar device 14 comprises a Doppler module assembly 18 and a transmitter 20. The Doppler module assembly 18 provides a relative velocity signal indicative of the relative velocity between ship 10 and radar device 14. This signal is transmitted by the transmitter to a remote receiver and indicator unit 22, which indicates the relative velocity on a display 24. In similar manner, the radar device 16 contains a Doppler module and a wireless transmitter, which transmits the relative velocity signal received from the Doppler module assembly 18 to the receiver and indicator unit 22. This second relative velocity is indicated by a second display 26. The receiver and indicator unit 22 is a portable device, as shown in FIG. 1. This receiver and indicator unit 22 can be held by the captain or pilot during the docking procedure. Unit 22 enables the captain to continuously watch the approaching velocity of the ship towards the dock.

Referring now to FIG. 2, numeral 28 in the Doppler module assembly 18 designates a microwave antenna. The microwave antenna 28 is a 240 mm long linearily polarized horn microwave antenna with an 80 mm × 80 mm aperture. The gain is 25 db at 24 GHz. The microwave antenna 28 is connected to a Doppler module 30. The Doppler module 30 is a GOS 2765 Doppler module manufactured by Alpha Industries, Woburn, Mass. The Doppler module 30 provides sine and cosine signals at outputs 32 and 34, respectively. The sine and cosine signals are applied to a signal conditioning circuit 36. The signal conditioning circuit 36 is based on a commercially available signal processing module manufactured by RECORD, Fehrdtorf, Switzerland. The signal processing module, which is designed to process the radar signals of radar door openers, contains two amplifier channels for the sine and cosine Doppler frequency signals.

The RECORD signal processing module has been modified by exchanging some of the capacitors at the inputs and in the feedback loops of the amplifiers in the two amplifier channels so as to extend the frequency range of the module towards low frequencies.

The Doppler device is to detect closing motion of the ship, that is to say motion of the ship towards the dock. The Doppler frequency is indicative of the absolute amount of the velocity only. A "closing" signal indicating whether the object is closing or receding can, however, be derived from the phases of the sine and cosine signals. With low closing velocities, such as those to be measured in the present case, such "closing" signal may become unstable.

Figure 4:
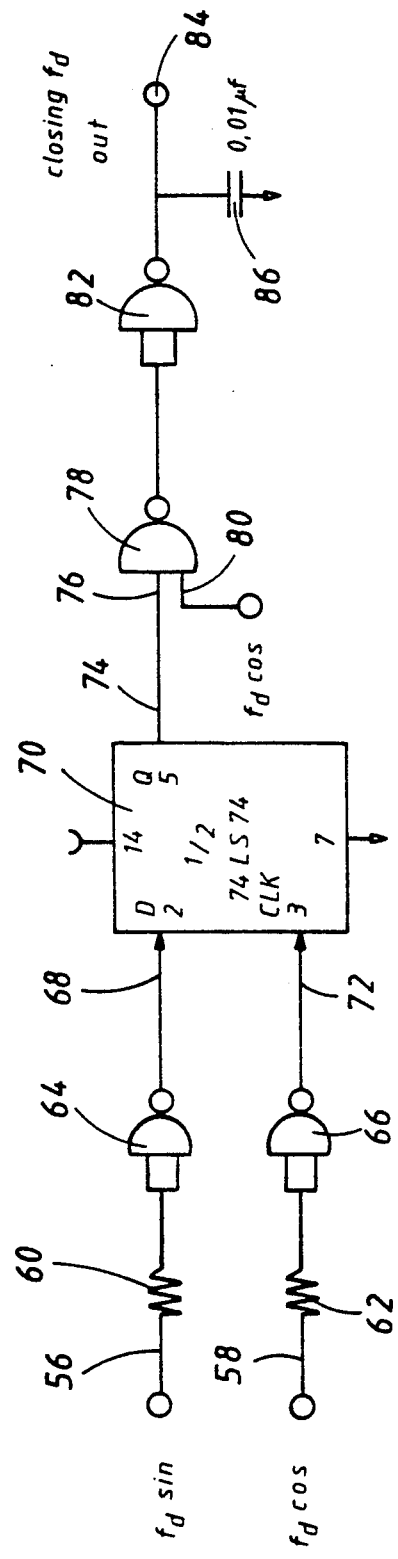
FIG. 4 is a diagram of a logic provided in the signal conditioning circuit.

For this reason, the logic of FIG. 4 is provided in the signal conditioning circuit. This logic ensures that, once a "closing" signal has been generated, such "closing" signal will continue to appear, until the sine and cosine Doppler frequency signals positively indicate "receding".

The logic of FIG. 4 receives the amplified sine and cosine Doppler frequency signals at inputs 56 and 58, respectively. These signals are applied, through 10 k - resistors 60 and 62, respectively, to inverters 64 and 66, respectively. The inverted signal from inverter 64 is applied to a "D" input 68 of a bistable device 70, i.e. a flipflop. The output from inverter 66 is applied to a clock input 72 of the bistable device 70. The bistable device 70 has an output 74. The output 74 will be high (H), if the signal at input 68 precedes the "clock" signal at input 72. In this case, the ship is closing, i.e. moving towards the dock. The output will become low (L), if the "clock" signal at input 72 precedes the signal at input 68. This will indicate that the ship is receding from the dock.

It will be apparent that, once the phase of the two sine and cosine signals has set the output of the bistable device 70 to H, the bistable device will remain in this state, even if the input signals disappear intermittently. The bistable device will change state only, after the phase of the sine and cosine signals have positively indicated a receding motion.

The output of the bistable device is applied to a first input 76 of a NAND-gate 78. The cosine Doppler frequency signal is applied to a second input 80 of the NAND-gate 78. The output from the NAND-gate is inverted by an inverter 82. The output from the inverter 82 is applied to a signal output 84. The signal output 84 is connected to ground through a 0.01 $\mu$F capacitor 86.

This logic ensures a continuous "closing" signal, and a correspondingly continuous signal processing and display, even with low closing velocities of the ship.

The signal conditioning circuit provides, at an output 38, a relative velocity signal. This relative velocity signal is indicative of the velocity of the ship relative to the stationary radar device 14 or 16. This relative velocity signal is supplied to a modulator-transmitter 40. The modulator-transmitter consists of a PCM modulator and a HF amplifier. The modulator consists of a SAW resonance module and adaptive circuitry. At least two modulators are used for each docking system to transmit the different velocity data. One modulator operates at 418 MHz. The other modulator operates at 433.9 MHz. The SAW modules are manufactured by RFM, Dallas, Tex. They are the Model MX 1019 for 418 MHz and Model MX 1005 for 433 MHz. The amplifier is a Mitsubishi M 57721 M module designed for portable radio transmitters in the 400 MHz to 450 MHz range.

The modulator-transmitter 40 is connected to a HF antenna 42. The HF antenna is a 100 mm long 400 MHz–450 MHz whip with a BNC connector on one end. The connector permits quick mounting to either the modulator-transmitter 40 or to the remote receiver and indicator unit 22. The antenna is commercially available from Conrad Electronics, Munich, Germany. Numeral 43 designates the power supply for the radar device 14.

The receiver and indicator unit 22 has a HF antenna 44. This antenna is of the same type as the antenna 42 of the radar device 14. The antenna 42 is connected to a receiver and demodulator module 46. The receiver module consists of two receiver cards, one for each frequency. The receiver cards are manufactured by Connaught, Galway, Ireland. There are two types which may be used: the delay line super regenerative type, models RX 433/1 for 433 MHz and model RX 418/1 for 418 MHz; or the models RX 433/2 and RX 418/2, which have 10 db less sensitivity than the /1-models. The receiver and demodulator provides, at an output 48, signals indicative of the signals transmitted by modulator-transmitter 40 and HF antenna, and thus indicative of the relative velocity signals.

These signals are applied to a signal processor 50. The signal processor level shifts the receiver outputs and scales the Doppler frequency information from the two receiver cards to a velocity frequency suitable for displaying. The scaling, currently, is from Doppler frequency to knots. Other units such as kilometers per hour or meters per second can also be used.

The relative velocity signals thus obtained from the signal processor 50 at output 52 are indicated by indicators 54 with the displays 24 and 26 (FIG. 1). The indicators 54 are two identical counter modules. The displays are LCD displays. Such indicators are commercially available from RS Electronics, 6082 Mürfelden-Walldorf, Germany. They are listed under RS order number 341-569.

The specifications achieved with such a system are as follows:

The radar range of radar device is 500 m for a 1000 $m^2$ target. The velocity range is from 0.02 to 7 meters per second. The emissions are 5 milliwatts at 24.125 GHz and less than 7 watts at 418 and 433 MHz. The telemetry range, i.e. the range within which the receiver and indicator unit can receive and correctly display the signals from the radar device or devices, is at least 500 meters. The telemetry covers 360°.

The radar beamwidth is 8 degrees with the microwave antenna 28 as described.

The remote receiver-demodulator 46 has a sensitivity of −95 dbm for the receiver cards RX 433/1 and RX 418/1, and of −85 dbm for the receiver cards RX 433/2 and RX 418/2. The sensitivity is valid for 360°.

The display is a four-digit LCD in hundredths of a knot.

The described system may be modified in various ways. For example, more than two radar devices, like 14 and 16, can be used along the dock. In this case, only the radar devices which sense the ship movement would provide indications. Thus those not indicating would show that the ship is not in their field of view. Thus the radar devices provide position indication in addition to velocity indication. Instead of mounting the radar devices on the dock, the radar devices may be mounted on the ship pointing to the dock.

I claim:

1. A relative velocity indicator system for assistance in the docking of vessels, comprising:
    (a) radar means providing a relative velocity signal indicative of the relative velocity between a ship and a reference,
    (b) wireless transmitter means associated with said radar means receiving said relative velocity signal and for transmitting a signal indicative of said relative velocity signal,
    (c) a receiver and indicator unit comprising
        receiver means for receiving said transmitted signal and
        indicator means arranged to receive, from said receiver means, a receiver signal indicative of said transmitted signal and, thereby, of said relative velocity signal for indicating said relative velocity, wherein said radar means are stationary on a dock and are arranged to detect approaching vessels, and wherein said radar means comprises more than one radar devices spaced on said dock, and said transmitter means comprise more than one transmitter device, each of said radar devices being connected to an associated one of said transmitter devices, said receiver means being adapted to receive transmitted signals from said more than one transmitter devices, said indicator means being adapted to simultaneously indicate relative velocities measured by said more than one radar devices.

2. A relative velocity indicator system for assistance in the docking of vessels, comprising
   (a) radar means providing a relative velocity signal indicative of the relative velocity between a ship and a reference,
   (b) wireless transmitter means associated with said radar means receiving said relative velocity signal and for transmitting a signal indicative of said relative velocity signal,
   (c) a receiver and indicator unit comprising
      receiver means for receiving said transmitted signal and
      indicator means arranged to receive, from said receiver means, a receiver signal indicative of said transmitted signal and, thereby, of said relative velocity signal for indicating said relative velocity,
wherein said radar means comprises means for generating signals indicative of closing motion of the detected object and means responsive to said signals indicative of closing motion for discriminating between closing and receding movement of the detected object and provide a "closing" output signal, and further comprising gating means for passing said relative velocity signal to said transmitter means only, if said closing signal indicates closing motion of the detected object.

3. A system as claimed in claim 2, wherein said discriminating means, upon having received signals indicative of closing motion, are arranged to provide a "closing" signal even if said signals indicative of closing motion are temporarily interrupted.

4. A relative velocity indicator system for assistance in the docking of vessels, comprising
   (a) radar device providing a relative velocity signal indicative of the relative velocity between a ship and a reference,
   (b) wireless transmitter means associated with said radar means receiving said relative velocity signal and for transmitting a signal indicative of said relative velocity signal,
   (c) a receiver and indicator unit comprising
      receiver means for receiving said transmitted signal and
      indicator means arranged to receive, from said receiver means, a receiver signal indicative of said transmitted signal and, thereby, of said relative velocity signal for indicating said relative velocity,
wherein said radar device comprises means for generating signals indicative of closing motion of the detected object and means responsive to said signals indicative of closing motion for discriminating between closing and receding movement of the detected object and provide a "closing" output signal, and wherein
   (a) said radar device comprises a radar Doppler module providing a sine and a cosine Doppler frequency signal,
   (b) said sine and cosine Doppler frequency signals first and second inputs of a bistable device which provides a first output signal, if a signal at said first input precedes a signal at said second input,
      provides a second output signal, if a signal at said second input precedes a signal at said first input,
   (c) gating means ar connected to said output and to one of said Doppler frequency signals to pass said one Doppler frequency signal, if said gating means provide one of said output signals and block said one Doppler frequency signal, if said gating means provide the other one of said output signals.

* * * * *